(12) United States Patent
von der Heyde

(10) Patent No.: US 6,260,903 B1
(45) Date of Patent: Jul. 17, 2001

(54) PORTABLE AUTOMOBILE PARTITION

(76) Inventor: Christian P. von der Heyde, 182 Greal Hill Rd., East Sandwich, MA (US) 02537

( * ) Notice: Subject to any disclaimer, the term of this patent is extended or adjusted under 35 U.S.C. 154(b) by 0 days.

(21) Appl. No.: 09/314,094

(22) Filed: May 18, 1999

(51) Int. Cl.$^7$ .............................. A47C 15/00; A47C 1/11; A47C 1/10
(52) U.S. Cl. ........................... 296/24.1; 296/63; 296/64; 297/248; 297/256.16
(58) Field of Search .............................. 296/24.1, 63, 64; 280/749, 751; 297/248, 256.16

(56) References Cited

U.S. PATENT DOCUMENTS

| | | | |
|---|---|---|---|
| 3,044,800 | 7/1962 | Wicker | 280/150 |
| 3,190,687 | 6/1965 | Johnson | 296/24 |
| 3,653,120 | 4/1972 | Sirrine et al. | 29/589 |
| 3,694,023 | 9/1972 | Burgess | 296/24 |
| 3,891,263 | 6/1975 | Orsulak | 296/24 |
| 3,931,994 | 1/1976 | Palmiter | 296/24 |
| 4,159,141 | 6/1979 | Dirck | 296/24 |
| 4,213,636 | 7/1980 | King | 280/749 |
| 4,366,977 | 1/1983 | Davis et al. | 296/24 |
| 4,509,788 | 4/1985 | Jan et al. | 296/24 |
| 4,595,227 | 6/1986 | Setina | 296/24 |
| 4,708,384 | 11/1987 | LaRosa | 296/24 |
| 4,919,467 | 4/1990 | Guimelli | 296/24.1 |
| 4,947,883 | 8/1990 | Mayo | 135/90 |
| 4,960,293 | 10/1990 | Bottinick et al. | 280/749 |
| 5,054,837 | 10/1991 | Chapman | 296/24 |
| 5,123,707 | * 6/1992 | Wurzell | 297/464 |
| 5,437,474 | 8/1995 | Ament | 280/749 |
| 5,511,842 | 4/1996 | Dillon | 296/24.1 |
| 5,716,095 | * 2/1998 | Lopez | 297/184.13 |
| 5,820,215 | * 10/1998 | Dreisbach | 297/256.16 |
| 5,971,487 | * 10/1999 | Passehl | 297/464 |
| 5,997,085 | * 12/1999 | MacLiver | 297/248 |

* cited by examiner

Primary Examiner—D. Glenn Dayoan
Assistant Examiner—Greg Blankenship
(74) Attorney, Agent, or Firm—Wolf, Greenfield & Sacks, P.C.

(57) ABSTRACT

A portable partition for use in an automobile having a seat with a seat bench and a seat backrest. The partition includes a seat plate that has first and second portions that rest on the seat bench. The partition also includes a partition plate that has a bottom edge connected to the seat plate between the first and second seat-plate portions. When the seat plate is disposed upon the seat bench, the partition plate is disposed substantially orthogonally of the seat bench. The partition plate typically is constructed of a substantially transparent material so that the driver's view is not obstructed by the partition plate. The partition may also have a hinge joining the first and second portions. The hinge permits the seat plate to more closely fit the seat bench, particularly when a child is seated on a cushion or a child seat placed on top of one or both of the portions of the seat plate. The partition plate typically extends vertically so that its top edge is near to the ceiling of the automobile, and its back edge is shaped to conform to the shape of the seat back. Thus, children respectively seated on a cushion or child seat on top of the two portions of the seat plate are separated from each other by the partition. The partition plate may have a seat-belt passage for receiving an automobile seat belt. Fastening the seat belt through the seat-belt passage secures the partition plate to the automobile seat.

20 Claims, 7 Drawing Sheets

PORTABLE AUTOMOBILE PARTITION

BACKGROUND OF THE INVENTION

1. Field of The Invention

The present invention relates generally to automobile passenger-compartment partitions, and, more particularly, to an automobile safety partition for children.

2. Related Art

Children seated in a rear seat of an automobile may engage in squabbling, fighting, or other behavior that may be distracting to the driver. Prior devices have been developed to separate the children by placing a partition between them. For example, U.S. Pat. No. 5,054,837 to Chapman is directed to a device that includes a planar panel and "J"-shaped mounting members to secure the panel orthogonally of the rear seat. Telescoping members may also be used in accordance with Chapman to frictionally engage surfaces of the automobile opposed to the seat in order to secure the panel in place. Once the panel is secured, children may be seated on the automobile seat, with the panel between them.

Another conventional device with a similar purpose is described in U.S. Pat. No. 4,595,227 to Setina. This device is a "Z"-shaped divider that may be positioned within an automobile to separate the operator from the passengers. The partitioning device of Setina includes a support bar frame having two legs that are attached to the floor of the automobile, and a roll bar that extends from the top of the support bar to a third leg anchored to the floor of the automobile. The front passenger seat apparently is removed to accommodate the installation of the device. Other conventional devices generally intended to separate passengers in an automobile or similar vehicle are listed in Chapman, at column 1.

SUMMARY OF THE INVENTION

A disadvantage of some conventional automobile partition devices is that they are intended to be permanent or are not easily removable. It often is the case, however, that a driver who is transporting children wishes to provide a separating partition, but does not wish to install a device that will restrict the use of the passenger compartment. For example, older children or adults not requiring the partition may also frequently use the rear seat. Other conventional devices are intended to be easily removed, but still require the use of various attaching mechanisms (such as the J-shaped and telescoping mounting members described in the Chapman patent, noted above). These attaching mechanisms generally are intended to provide stability to the devices, but may add significantly to their weight and bulk, and/or to the complexity of their installation. Typically, a driver does not wish to carry to and from the vehicle, or store therein, a cumbersome mechanism that is difficult to carry or requires substantial storage space.

The disadvantages of the prior art are overcome in one embodiment of the portable partition of the present invention for use in an automobile. As used herein, the word "utomobile" is to be understood broadly to include any type of motor vehicle, including a truck, van, recreational vehicle, mobile home, and so on. The automobile has a seat including a seat bench and a seat backrest. The partition includes a seat plate that has first and second portions structured to rest on the seat bench, and a partition plate. Typically, the seat plate is disposed medially on the seat bench since an automobile seat bench typically is structured to accommodate two people and perhaps a third person in the middle. Therefore, medial disposition of the seat plate generally accommodates two children on the seat bench. However, in alternative embodiments, the seat plate may be disposed elsewhere on the seat bench so that, for example, two children may be separated by it on one side of the seat bench and an adult may be seated on the other side of the seat bench.

The partition plate has a bottom edge connected to the seat plate between the first and second seat-plate portions. When the seat plate is disposed upon the seat bench, the partition plate is disposed substantially orthogonal to the seat bench. In some aspects, the partition plate is constructed in part of a substantially transparent material. Thus, the driver's view is not obstructed by the partition plate.

In one implementation of this embodiment, the partition also has a hinge that joins the first and second portions. The hinge may be made of a flexible material, or it may be another type of hinge device. The hinge advantageously permits the seat plate to more closely fit the seat bench, particularly when a child is seated on a cushion or a child seat placed on top of one or both of the portions of the seat plate. The weight of the child or children may cause the seat bench to depress, and this depression may not be uniform across that portion of the seat bench upon which the seat plate is disposed. Thus, without the hinge, one or the other portion of the seat plate may rise when the other falls due to depression of the seat bench or for other reasons, such as the seat bench not being uniformly planar. Alternatively, if two children are seated on respective portions of the seat plate, the seat plate may be subject to undesirable stresses intermediate the two portions, or a see-saw effect may result, particularly if there is a protrusion or some kind of rigid member between the two sides of the seat bench. Placement of the hinge intermediate the two portions of the seat plate typically reduces or eliminates these stresses and effect.

Advantageously, whether the seat plate is hinged or not, the weight of the child or children on the seat plate (seated either in a car seat or on a cushion) provides stability to the seat plate. Therefore the partition plate is also stabilized because, as noted, its bottom edge is connected to the seat plate. Thus, the children themselves, in cooperation with the seat plate, act as stabilizing mechanisms for the partition device as a whole. In effect, the children replace, or reduce the need for, conventional stabilization mechanisms.

The partition plate may extend vertically so that its top edge is near to the ceiling of the automobile. This vertical extension may be advantageous, for example, in ensuring that children seated on a cushion or car seat on top of seat plate portions on either side of the vertical partition plate cannot throw objects over the partition plate. The back edge of the partition plate may be shaped to conform to the shape of the seat back and to provide that the back edge and the seat back are close to each other. For example, it may be determined that a typical automobile seat backrest is set at a slightly reclining angle with respect to the automobile seat bench. An appropriate implementation of the portable partition for use in this kind of automobile thus may include a partition plate having a back edge that makes an angle with the bottom edge of the partition plate that is slightly greater than ninety degrees. Similarly, for automobile seat backrests that are slightly convex, the partition plate's back edge may be slightly concave. Close shaping and spacing of the back edge of the partition plate with the seat backrest may help to keep the children from intruding into the other's space.

In addition, the proximity of the partition plate and the seat backrest may facilitate the optional use, in some aspects of this implementation, of a seat-backrest hook. The seat-backrest hook is slidably connected to the back edge of the partition plate, and is constructed and arranged so that it may engage a top surface of the seat backrest. This optional seat-backrest hook provides additional stability to the partition plate and may also be used as a handle to carry the partition in its stored position. Thus, in contrast to some of the attaching mechanisms used with conventional separation devices, the seat-backrest hook of the present invention optionally provides additional stability while facilitating transport of the device.

The partition plate may include a track connected to its back edge that receives the seat-backrest hook for sliding. The partition plate may also have stopping means for selectively fixing the seat-backrest hook in the track. Thus, when the seat-backrest hook is moved downward in its track until it engages the top of the seat backrest, the partition plate is secured from moving away from the seat backrest. In some aspects, the depth of the partition plate is substantially coextensive with the depth of the seat bench. This feature again may help in preventing one child from intruding, or throwing an object, into the space of the other child.

Where a seat-backrest hook cannot readily be used, ceiling posts may be provided to stabilize the partition plate. The ceiling posts may also be used with a seat-backrest hook.

In some implementations, the partition also includes securing means for securing the bottom edge of the partition plate to the seat plate. In some aspects of these implementations, the securing means is structured so that it secures the partition plate substantially orthogonal to the seat plate. For example, the seat plate may have a channel between the first and second portions that receives the bottom edge of the partition plate, and the securing means may include the channel and means for fixing the bottom edge of the partition plate to the seat plate when the partition plate is disposed within the channel. In some aspects, the securing means may include a snap fastener. Similarly, in some aspects of an implementation that includes a hinge, the seat plate may have a channel formed at the bottom by the hinge and having first and second sides defined by opposing edges of the two portions of the seat plate. The bottom edge of the partition plate is disposed within this channel.

In some implementations, the partition plate includes a seat-belt passage for receiving an automobile seat belt. Fastening the seat belt through the seat-belt passage secures the partition plate to the automobile seat.

Advantageously, when the partition is not in operation, the first and second portions of the seat plate may be rotated about the hinge to a portable position such that the first and second portions are substantially parallel and adjacent to the partition plate. In some aspects of these implementations, securing means are included for securing the first and second portions of the seat plate in the portable position.

In other embodiments, the invention is a child car-seat partition assembly for use in an automobile. The automobile has a seat including a seat bench and a seat backrest. The assembly includes a seat plate having first and second portions, each having an upper surface and each being structured to rest on the seat bench. The assembly also includes a partition plate having a bottom edge connected to the seat plate intermediate the portions. Further included in the assembly is at least one child car-seat disposed at least in part upon the upper surface of one of the first and second portions. For example, one child car-seat may be disposed at least in part upon the upper surface of the first portion, and another child-car-seat may be disposed at least in part upon the upper surface of the second portion. When the seat plate is disposed upon the seat bench, the partition plate is disposed substantially orthogonally of the seat bench. In some implementations of these embodiments, the assembly further includes a hinge joining the first and second portions.

BRIEF DESCRIPTION OF THE DRAWINGS

The above and further advantages of the invention will be more clearly appreciated from the following detailed description when taken in conjunction with the accompanying drawings, in which like reference numerals indicate like structures, and wherein.

DETAILED DESCRIPTION

Figure 1:
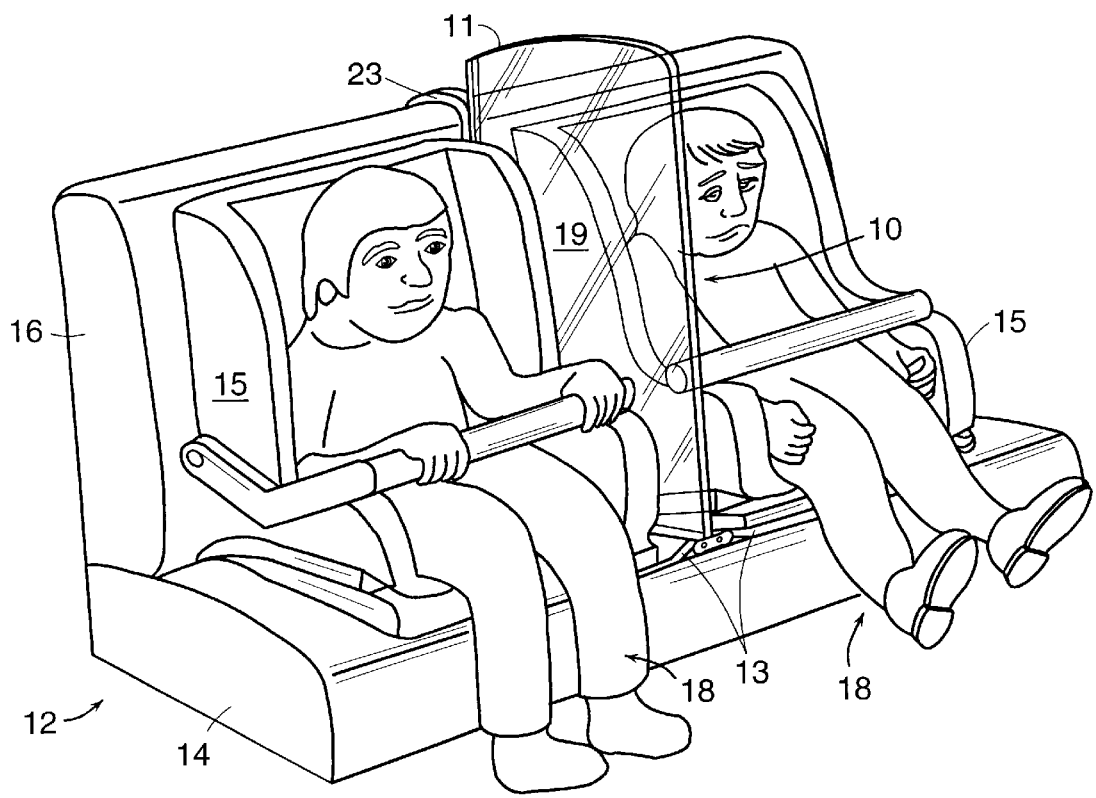
FIG. 1 is a perspective view of one embodiment of a portable partition in accordance with the present invention disposed on an automobile seat and in use with child car-seats.

The attributes of the present invention and its underlying architecture will now be described in greater detail with respect to one embodiment shown in FIG. 1 and referred to as portable partition 10. Partition 10 is shown disposed on an automobile seat 12 having a seat bench 14 and a seat backrest 16. Partition 10 includes a seat plate 13 and a partition plate 19. Children 18 are illustratively shown seated in car seats 15 that rest on a seat plate 13. Partition plate 19 has a top edge 11, a back edge 17, and a bottom edge 71 (FIG. 7B).

Figure 2:
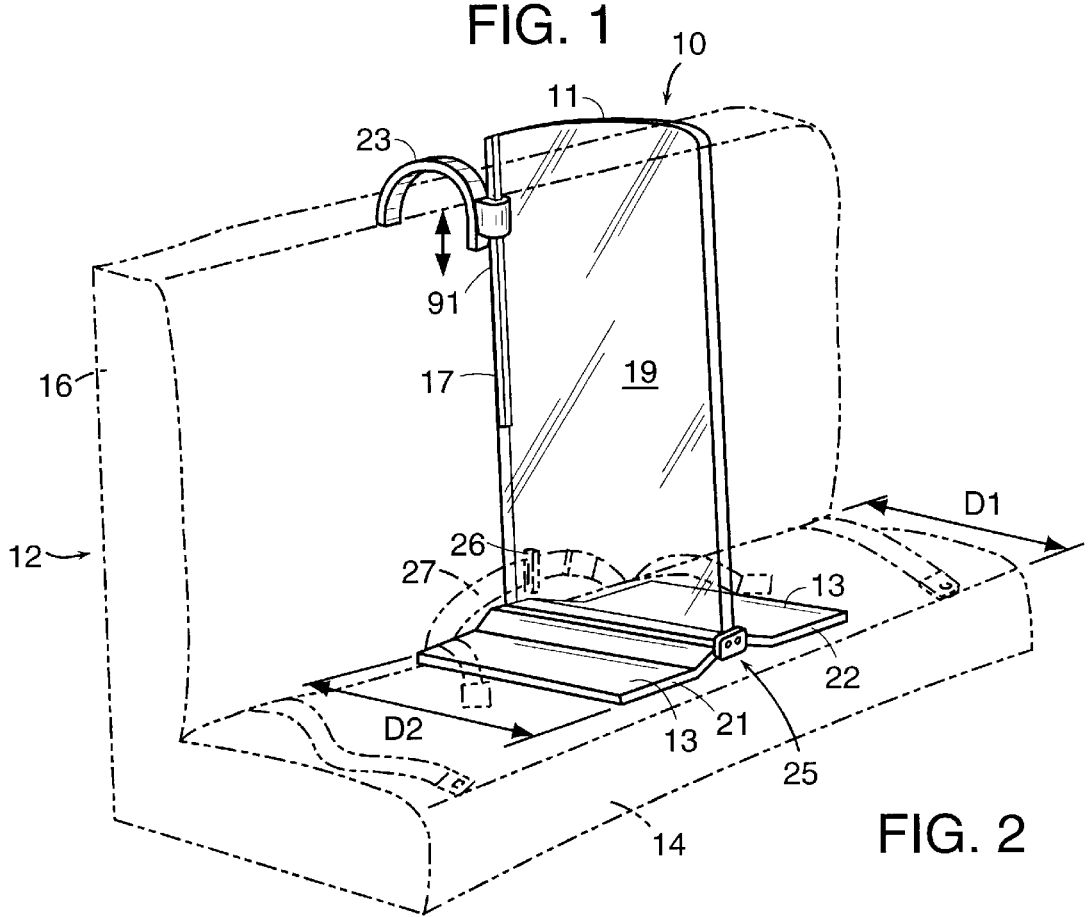
FIG. 2 is a perspective view of the portable partition of FIG. 1 in which the backrest of the automobile seat is shown in phantom.

The seat plate, and other elements of partition 10, are more clearly seen in FIG. 2. FIG. 2 is a perspective view of partition 10 without the children or car seats and in which backrest 16 is shown in phantom. Seat plate 13 includes a first portion 21 and a second portion 22 that each rest on seat bench 14. In the illustrated embodiment, seat bench 14 has a depth D1, and seat plate 13 has a depth D2 that preferably is substantially coextensive with depth D1, although it need not be. This arrangement may provide additional stability due to the greater surface areas of portions 21 and 22 in contact with seat bench 14 and, in some implementations, improved contact between car seats 15 and portions 21 and 22. However, it will be understood that other arrangements are possible in alternative embodiments such that depth D2 is not substantially coextensive with depth D1.

A hinge 25, two implementations of which are described below with respect to FIGS. 7A and 7B, joins first and second portions 21 and 22 of the illustrated embodiment. Partition plate 19 is disposed at an angle (FIG. 6) with respect to top surface 61 of seat bench 14, and portions 21 and 22 which lie substantially parallel to the top surface 61 of seat bench 14. This angle typically is 90°. As described in greater detail below with respect to FIGS. 7A and 7B, the orthogonal position of partition plate 19 with respect to portions 21 and 22 is maintained by connecting the bottom edge 71 of plate 19 to seat plate 13 intermediate portions 21 and 22.

Advantageously, partition plate 19 of the illustrated embodiment is made of a substantially transparent material, such as the LEXAN® resin made by General Electric Company, or any of a variety of clear plexiglass, plastics, and other materials. Preferably, the material is durable, lightweight, and substantially unbreakable. The transparency of partition plate 19 may improve the ability of a driver of the vehicle to see objects outside the vehicle, such as by looking through an interior rear-view mirror, and to see the children on the seat 12. In other embodiments, however, partition plate 19 need not be substantially transparent, or only portions of it may be substantially transparent. For example, if seat 12 is a rearward-facing seat in the rear portion of a station wagon automobile, obstruction of the driver's visibility may not be a consideration. An opaque partition plate, particularly where driver visibility is not an issue, may be used in alternative embodiments so that the children cannot visually provoke each other.

Back edge 17 may be shaped to conform to a typical shape or shapes of seat backrest 16. In the illustrated embodiment back edge 17 is shown straight, but it need not be so in alternative embodiments. For example, a typical automobile seat backrest 16 of one or more types of automobiles may have a slightly convex surface upon which passengers rest their backs. Back edge 17 in alternative embodiments for use with these automobiles therefore would have a slightly concave shape. It is assumed that in a typical seat 12, backrest 16 is orthogonal to seat bench 14. However, it need not be so. In some types of automobiles, backrest 16 may be, for example, slightly reclined at an angle with respect to seat bench 14. Thus, in embodiments for use with these automobiles, back edge 17 would be disposed at an angle with respect to the plane of seat plate 13 that is slightly greater than ninety degrees. Conforming the shape of plate 19 to the arrangement and shape of seat 12 in this manner generally reduces any spaces between plate 19 and backrest 16. This closer fit is useful in preventing children 18 from touching each other. For a similar reason, partition plate 19 typically has a height (i.e., from bottom edge 71 to top edge 11) such that its top edge 11 is disposed in closely spaced proximity to the interior ceiling (not shown) of the automobile.

It may be desirable to prevent the movement of partition 10 in a direction away from seat backrest 16. For example, if seat 12 is forward-facing, partition 10 should be prevented from moving forward in case of a sudden stop. In the illustrated embodiment, a seat-belt passage 26 is provided in partition plate 19 through which a restraining device, such as a seat belt 27, may be passed. In the illustrated embodiment, seat belt 27 is a belt provided for a third passenger seated in the middle of seat 12. In alternative embodiments, one of the seat belts used to secure car seats 15 and/or children 18 may be passed or looped through seat-belt passage 26. For this purpose, passage 26 may include two or more slits or openings, one for passing the belt through plate 19 and one for returning the belt through plate 19. Alternatively, rather than providing a seat-belt passage, a seat belt may be secured to a loop, hook, or any other attaching mechanism connected to plate 19 and/or portions 21 and 22. Additionally, the illustrated embodiment includes a seat-backrest hook 23 that further prevents partition 10 from moving forward in a sudden stop. As shown in greater detail in FIG. 9, hook 23 may slide in a track along back edge 17 of plate 19. In another embodiment, where a seat-backrest hook cannot readily be used, ceiling posts 120 may be provided for stabilizing the partition, as described more fully below with respect to FIGS. 10–12.

Figure 3:
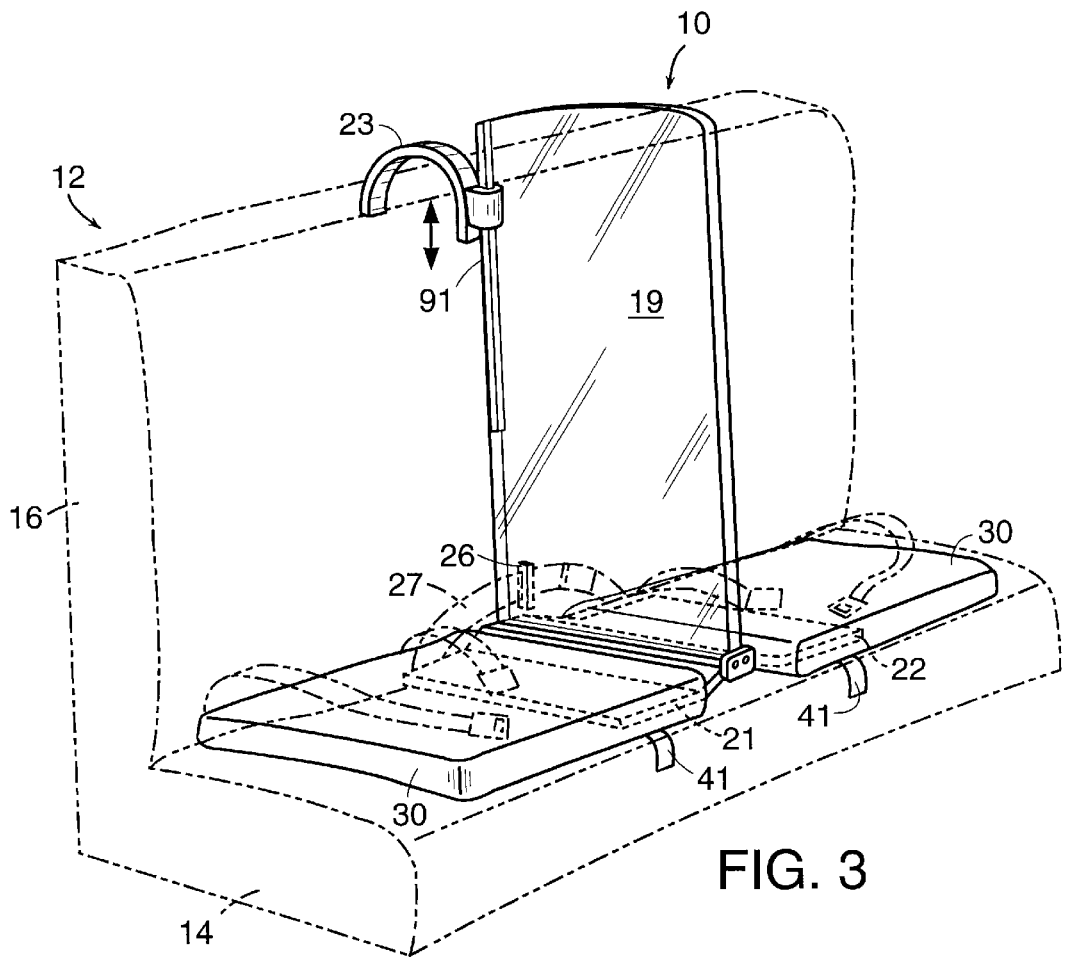
FIG. 3 is a perspective view of the portable partition of FIG. 1 in use with cushions.

FIG. 3 is a perspective view of partition 10 with cushions 30. Typically, this arrangement is suitable for older children who do not use car seats. The word "cushions" is to be understood broadly and to encompass, for example, any type of seat, padding, or support upon which children 18 may sit. The cushions may be made of foam, or another resilient material, and may be contoured for seating.

The cushions are provided for comfort and to distribute a portion of the children's weight onto portions 21 and 22 of seat plate 13, shown in phantom in their positions under cushions 30. In the illustrated embodiment, portions 21 and 22 extend only partially under cushions 30 (and under car seats 15 as shown in FIG. 1). The weight and bulk of partition 10 may thereby be reduced as compared to an alternative embodiment in which portions 21 and 22 extend further and therefore are larger. In general, the amount by which portions 21 and 22 extend under cushions 30 or car seats 15 need only be such that a significant percentage of the weight of the children is applied to portions 21 and 22, thereby providing stability to partition 10. This percentage typically varies depending on a variety of factors that will be appreciated by those skilled in the relevant art, such as the weight of the children, the structure of the bottom of car seats 15, the rigidity of cushions 30, and other factors. In the illustrated embodiment, this percentage is roughly 33 percent, but it will be understood that it is exemplary only. In some embodiments, portions 21 and 22 may extend further so that children 18 may be seated directly on them. Typically, portions 21 and 22 in these embodiments are made of, or include, a material that is comfortable to sit on. Alternatively, or in addition, portions 21 and 22 may be structured for comfortable seating. For example, in one implementation of these embodiments, a cushion or molded depression may be fashioned into portions 21 and 22.

Figure 4:
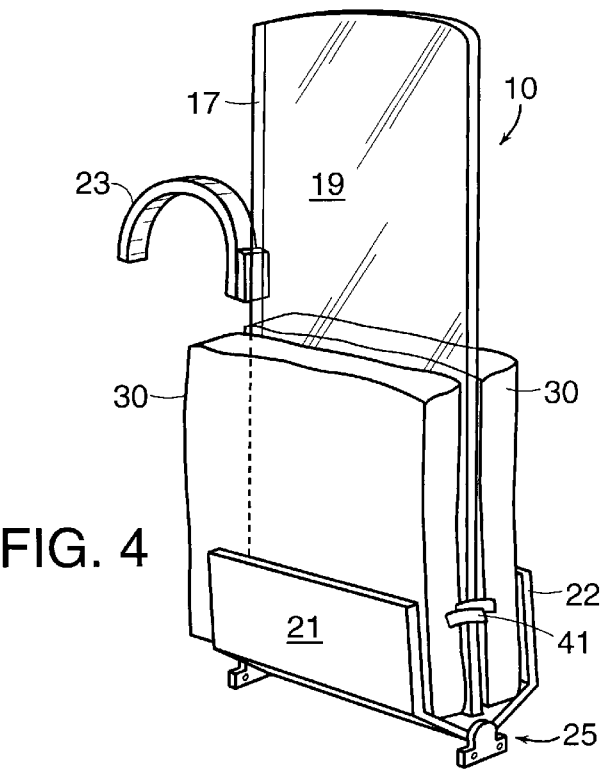
FIG. 4 is a perspective view of the portable partition of FIG. 3 in a stowed position with cushions.

Advantageously, partition 10 of the illustrated embodiment may be folded for portability, as shown in FIG. 4. In the portable position of this embodiment, portions 21 and 22 are rotated about hinge 25 so that they are substantially parallel and adjacent to partition plate 19. In FIG. 4, cushions 30 are included in the folded assembly, sandwiched between plate 19 and portions 21 and 22. In alternative embodiments, cushions 30 need not be included in the folded assembly. Any of a variety of conventional devices may be used to secure portions 21 and 22 in the folded position. Latch 41 is shown in the illustrated embodiment as two hook and loop fasteners, one of many examples of such seat-portion securing means. Latch 41 secures portion 21 to portion 22, but other implementations could include means for securing portions 21 and 22 to plate 19. Also, in alternative embodiments, various types of lock assemblies may be included in hinge 25 to hold portions 21 and 22 in the folded position, one example of which is described below in relation to FIGS. 7C and 7D. In the illustrated embodiment, seat-backrest hook 23 may be used as a carrying handle. As described below with respect to FIGS. 8 and 9, a ratchet track 91 on back edge 17 of plate 19 prevents hook 23 from sliding upward when being used as a carrying handle. In alternative embodiments, any of a variety of other conventional techniques may be used to secure hook 23.

Figure 6:
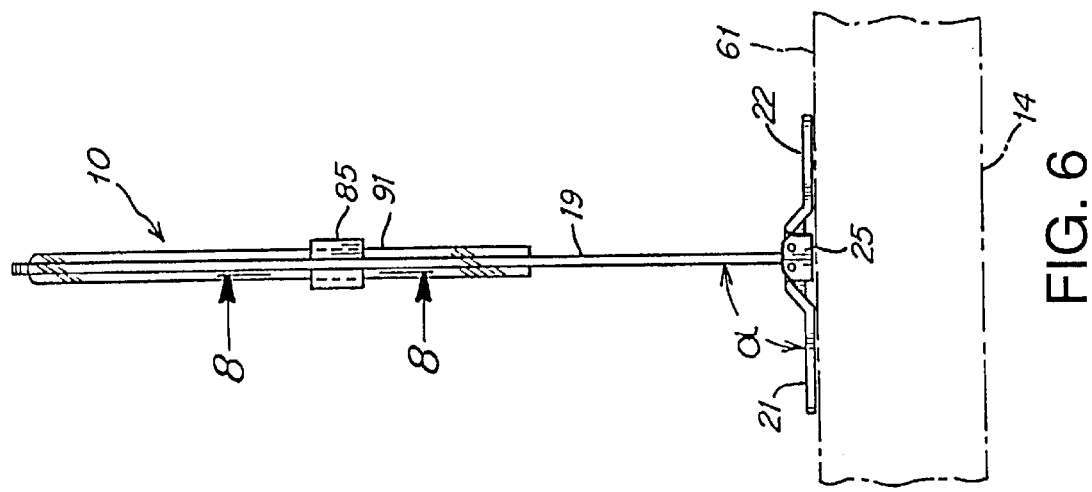
FIG. 6 is a front elevational view of the portable partition of FIG. 1 along a view line shown in FIG. 5.
Figure 5:
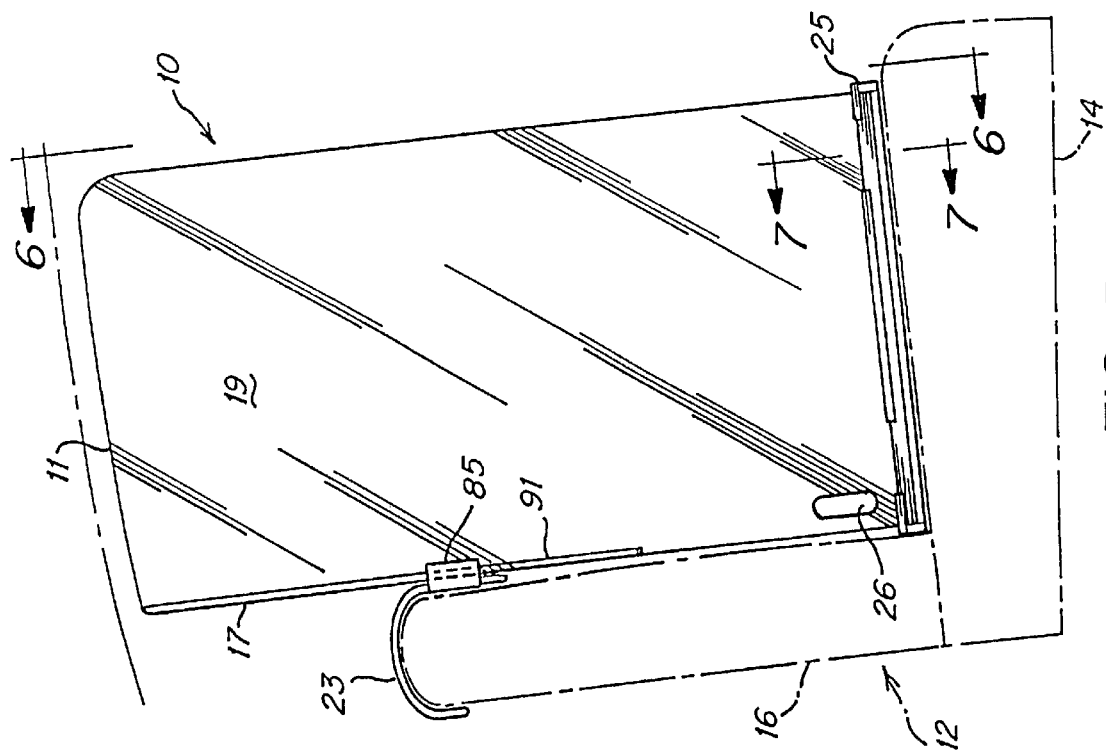
FIG. 5 is a side elevational view of the portable partition of FIG. 1.

Various hinge mechanisms may be employed to enable portions 21 and 22 to move between the portable position and the in-operation position. Two exemplary types of hinge mechanisms are now described with reference to FIGS. 5, 6, and 7A–7D. FIG. 5 is a side elevational view of partition 10 in the in-operation position; i.e., disposed so that portions 21 and 22 rest on seat bench 14. As noted, back edge 17 of plate 19 of the illustrated embodiment is spaced in proximity to seat backrest 16. FIG. 6 is a front elevational view of partition 10 along view line 6—6 of FIG. 5.

Figure 7A:
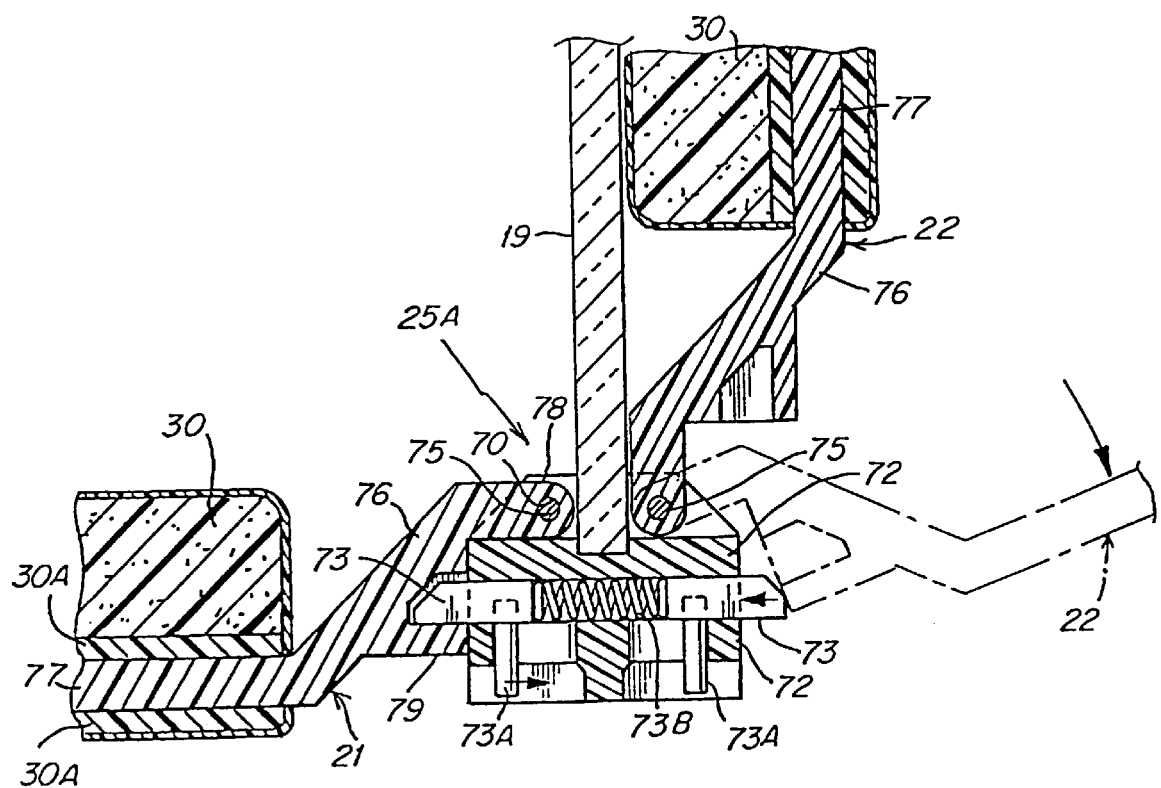
FIG. 7A is a cross-sectional view of one embodiment of a hinge of the portable parition of FIG. 1 along a view line shown in FIG. 5.
Figure 7B:
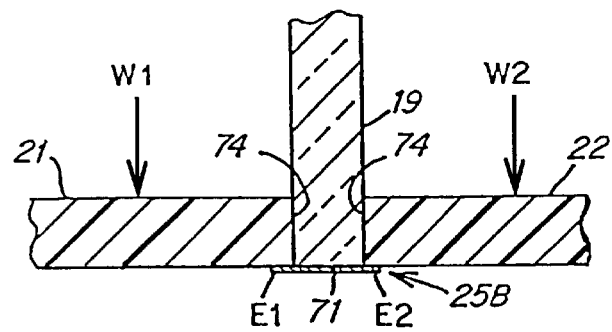
FIG. 7B is a cross-sectional view of another embodiment of a hinge of the portable partition of FIG. 1 along a view line shown in FIG. 5.

FIG. 7A is a cross-sectional view of one embodiment of hinge 25, referred to as hinge 25A, shown along view line 7—7 of FIG. 5. Portions 21 and 22 of seat plate 13 include, in this embodiment, hinge arms 76 that extend from the main parts 77 of portions 21 and 22 and each form an obtuse angle with the planes of their respective main parts 77. Each of arms 76 ends in hinge fingers 78 and locking fingers 79. Hinge fingers 78 include holes 70 for receiving hinge pins 75 around which portions 21 and 22 may rotate upward toward plate 19. Pins 75 are secured to a hinge base 72 having an upper surface on which hinge fingers 78 rest in a locked position. As portions 21 and 22 are lowered into the locked position, locking fingers 79 engage locking slides 73 that slide within hinge base 72. Slides 73 thus are urged against locking fingers 79 by a spring 73B disposed between locking slides 73. In FIG. 7A, portion 21 is shown in the locked position, and portion 22 is shown in the portable position and also, in phantom, being lowered from the portable position toward the locked position. Slides 73 are connected to, and held in hinge base 72 by, release pins 73A. When in the locked position, slides 73 are disposed in the spaces formed between fingers 78 and 79 respectively, and the tips of fingers 79 engage base 72. Portions 21 and 22, in this locked position, are prevented from rotating upward toward plate 19 by the protrusion of slides 73 into these spaces.

Cushions 30 may be attached to main parts 77 by providing a channel in cushions 30 into which main parts 77 may be fitted, as shown in FIG. 7A. In some implementations, cushions 30 may include channel liners 30A to line the channels so that main parts 77 fit more tightly into the channel and may more easily be slipped in and out of the channel, to protect the channel from wear, and to perform other functions. Channel liners 30A may be made of any suitable material, such as a rigid plastic.

Figure 7C:
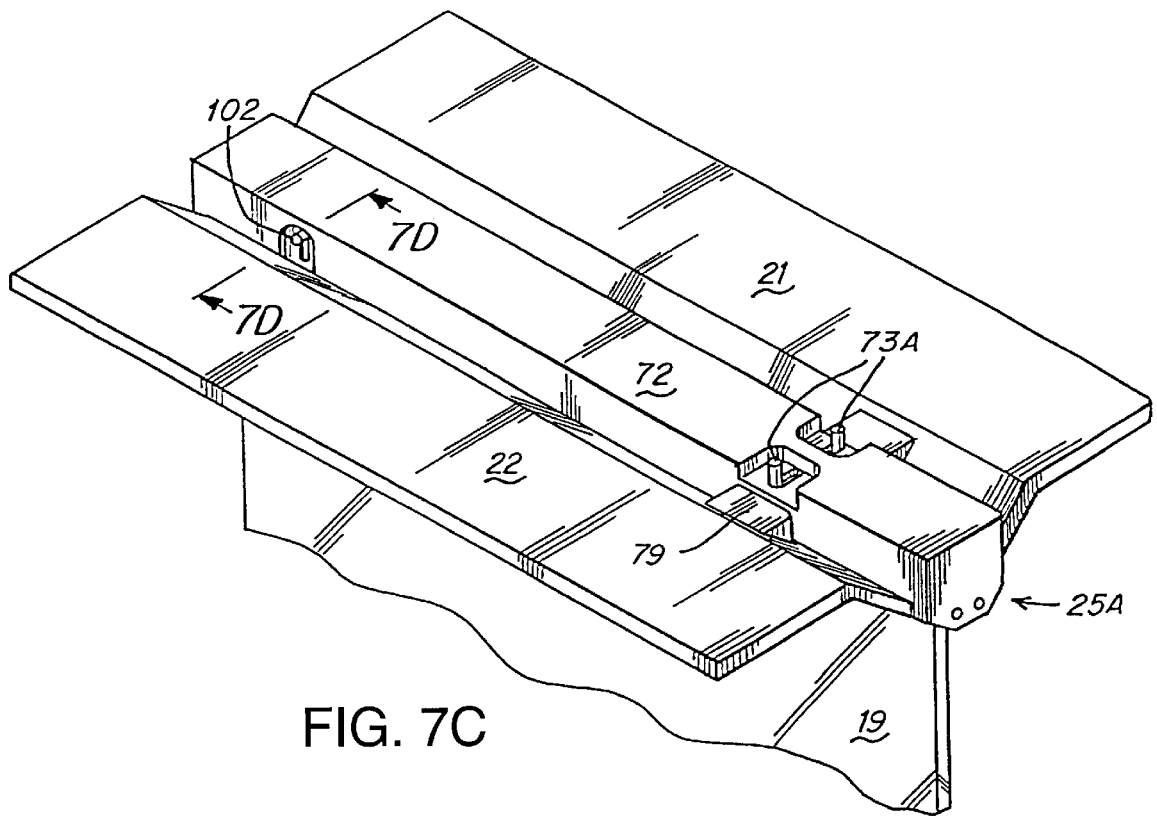
FIG. 7C is a bottom perspective view of the portable partition of FIG. 1 showing aspects of the hinge of FIG. 7A.
Figure 7D:
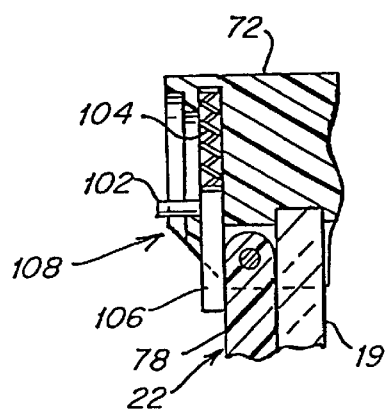
FIG. 7D is a cross-sectional detail of a portable-position locking mechanism of the hinge of FIGS. 7A and 7C along a view line shown in FIG. 7C.

FIG. 7C is a perspective view of the bottom of partition 10 showing the bottoms of portions 21 and 22 and hinge base 72. As shown in FIG. 7C, release pins 73A may be squeezed together so that slides 73 are withdrawn from the spaces between fingers 78 and 79 and thus portions 21 and 22 are free to rotate upward toward plate 19. Plate 19, in this embodiment, may be cemented or otherwise fixed into a conforming channel in the top of base 72 so that plate 19 is secured substantially orthogonal to the plane of main parts 77 of portions 21 and 22 in the locked position. Also shown in FIG. 7C is a lever 102 of an exemplary portable-position locking mechanism 108 of hinge 25A. FIG. 7D is a cross-sectional detail of mechanism 108 showing portion 22 in the portable position. As shown in FIG. 7D, lever 102 is connected to locking pin 106 so that pin 106 moves in a channel of base 72 when lever 102 is moved by a user. Spring 104 urges pin 106 out of the channel so that it engages a side of the one of hinge fingers 78 corresponding to portion 22 when that hinge finger 78 is in the portable position. Thus, that one of hinge fingers 78 is sandwiched between pin 106 and plate 19 so that portion 22 may be prevented from swinging away from plate 19. A similar mechanism 108 is provided with respect to portion 21. Thus, when a user wishes to disengage portion 22 from the portable position, the user moves lever 102 so that pin 106 moves toward spring 104 and into the channel provided for it in base 72. Hinge finger 78 is thus free to rotate into the in-use position in which it is shown in FIG. 7C. A similar technique is used to disengage portion 21 from the portable position.

FIG. 7B is a cross-sectional view of another embodiment of a hinge 25 of partition 10, referred to as hinge 25B, along view line 7—7 of FIG. 5. In this alternative embodiment, hinge 25B includes a flexible member made of a fabric, flexible plastic, rubber, or another suitable flexible material. Hinge 25B typically, but not necessarily, has a depth coextensive with depth D2 of portions 21 and 22. Hinge 25B has opposing lateral edges E1 and E2 that are respectively attached to portions 21 and 22. A channel is formed by opposing edges 74 of portions 21 and 22 of seat plate 13, and by the top surface of hinge 25B. Partition plate 19 may be slipped into the channel so that its bottom edge 71 abuts the top surface of hinge 25B and so that plate 19 is supported by opposing edges 74. Forces W1 and W2 are exerted on portions 21 and 22, respectively, due to the weight of children 18 seated either in car seats 15 or on cushions 30 on top of portions 21 and 22, or seated directly on portions 21 and 22. Therefore, forces W1 and W2 generally prevent the channel between opposing edges 74 from widening and stabilize plate 19 in the channel.

When it is desired to remove partition 10 from the automobile, plate 19 may be removed by slipping it out of the channel between opposing edges 74. Hinge 25B enables portions 21 and 22 to be folded together, either downward (in the direction shown by forces W1 and W2), and/or upward in implementations in which the combined thicknesses of portions 21 and 22 are less than or equal to the width of the channel (or if hinge 25B can expand to accommodate the combined thickness). Any of a variety of conventional techniques may be used to prevent plate 19 from slipping out of the channel. For example, snap fasteners (not shown) may be included that protrude from opposing edges 74 into receiving indentations (not shown) in plate 19.

It will be understood that hinges 25A and 25B are exemplary only of the many possible types of mechanisms that may be included in hinge 25. For example, hinge 25 may also be a piano-type hinge (not shown) with a depth substantially coextensive with depth D2 of seat plate 13, or two or more smaller hinges of this type spaced along depth D2. The two wings of these piano-type hinges would be fixed respectively to portions 21 and 22 of seat plate 13.

In other embodiments, there need not be a hinge 25. Rather, seat plate 13 may be bonded directly to plate 19. For example, plate 13 may include a channel (not shown) formed or cut that is structured to receive bottom edge 71 of plate 19. Thus, all of seat plate 13 may be of unitary construction, and the opposing sides of the channel may support plate 19 orthogonally of the seat plate. In these embodiments, plate 19 may be fixed in the channel using any known adhesive substance, material, or device, or it may be removable. In those implementations in which plate 19 is removable, any of a variety of conventional techniques may be used to prevent plate 19 from slipping out of the channel, as noted above.

Figure 8:
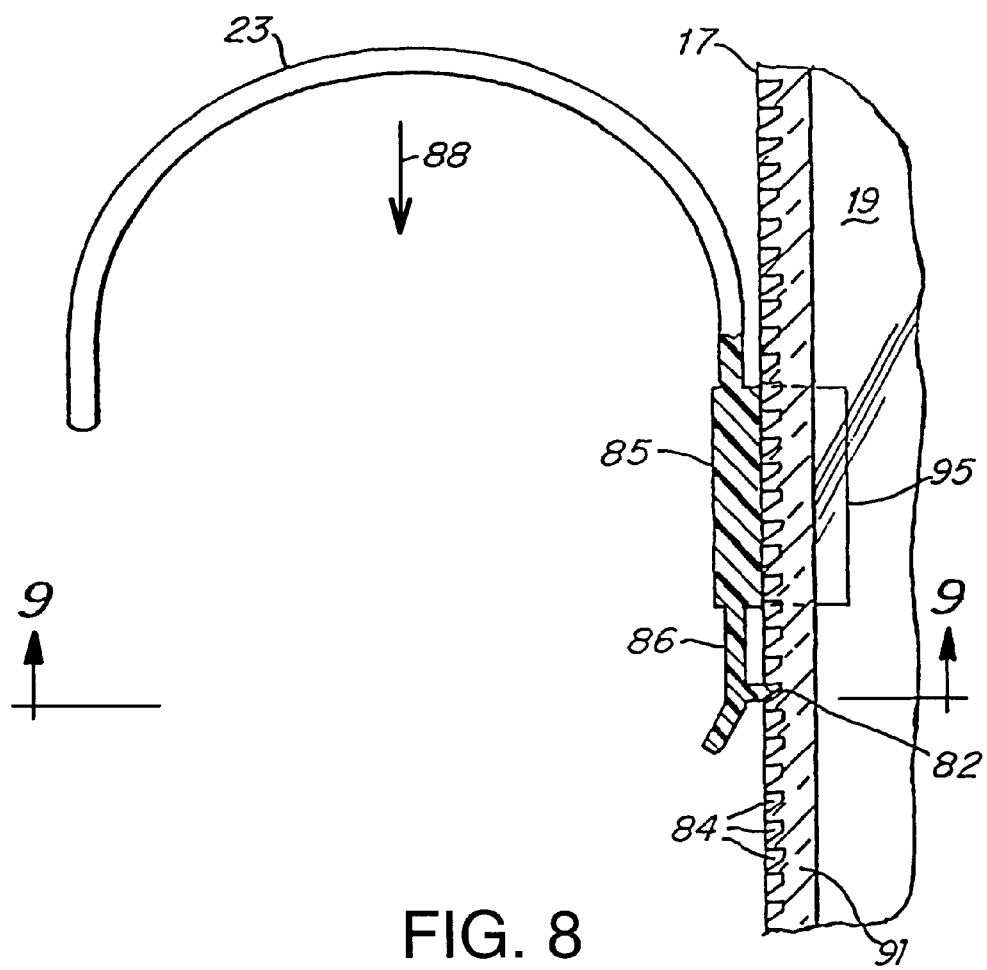
FIG. 8 is a cross-sectional side view of one embodiment of a seat-backrest hook of the portable partition of FIG. 1 along a view line shown in FIG. 6.
Figure 9:
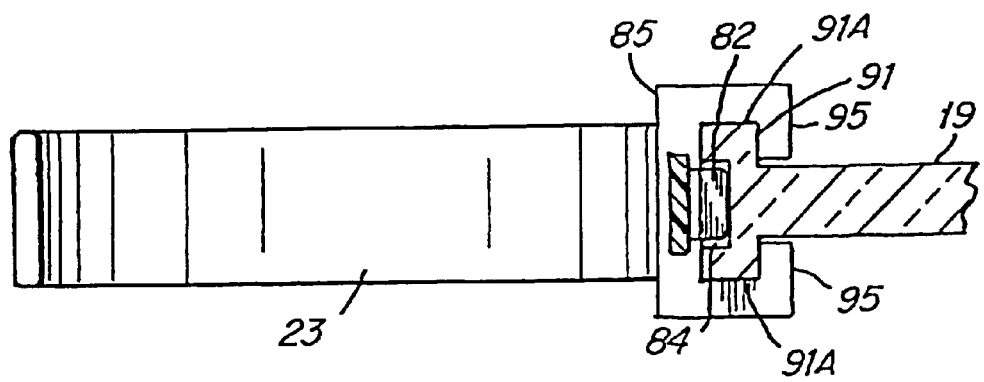
FIG. 9 is a bottom elevational view of one embodiment of a track of the portable partition of FIG. 8 along a view line shown in FIG. 8.

An exemplary embodiment of seat-backrest hook 23 is now described with respect to FIGS. 8 and 9. FIG. 8 is a cross-sectional side view of one embodiment of seat-backrest hook 23 along view line 8—8 of FIG. 6. FIG. 9 is a bottom elevational view, along view line 9—9 of FIG. 8, of one embodiment of a track 91 of partition 10 along which hook 23 may slide. As shown in FIG. 9, back edge 17 of partition plate 19 of the illustrated embodiment flares out into a "T" shape. Top portions 91A of the "T" shape provide a track around which a track-receiving portion 85 of hook 23 may slide. Grabbing portions 95 of track-receiving portion 85 slide behind top portions 91A so that hook 23 does not disengage from the track. In the illustrated embodiment, periodic indentations 84 are formed or cut into back edge 17. Hook 23 includes a flexible handle 86, made of flexible plastic, rubber, or another suitable material, that has a tab 82 protruding from it toward back edge 17. Tab 82 is urged against, and fits into, any of indentations 84. For example, tab 82 and indentations 84 may be structured in accordance with conventional techniques to form a one-way ratchet so that hook 23 may freely slide downward in the direction indicated by arrow 88 of FIG. 8. The ratchet structure prevents hook 23 from moving upward unless flexible handle 86 is pulled away from back edge 17, thus disengaging tab 82 from one of indentations 84. In this manner, hook 23 may be lifted above seat backrest 16, lowered until it engages the top of seat backrest 16, and secured in this position by allowing tab 82 to engage the nearest of indentations 84. Hook 23, and thus partition 10 to which it is attached, is disengaged from seat backrest 16 by pulling on flexible handle 86 to disengage tab 82 and lift hook 23. It will be understood that this example is illustrative only, and that many other conventional techniques and designs may be used to enable hook 23 to slide up and down back edge 17 of plate 19 and to be secured in a particular location along back edge 17.

Figures 10, 11:
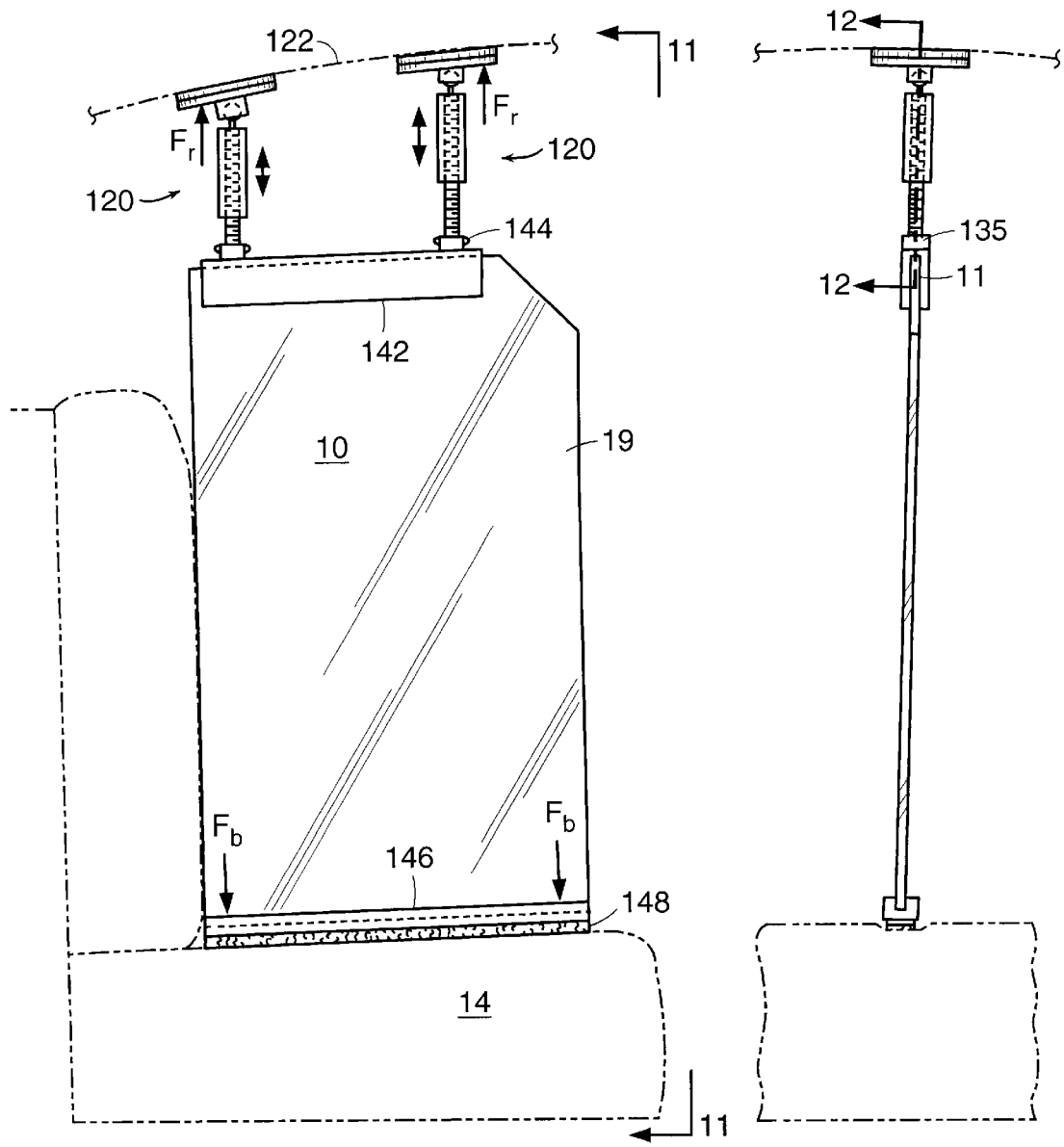
FIG. 10 is a side elevational view illustrating another embodiment of the portable partition of this invention having ceiling posts.
FIG. 11 is an end, elevational view of the embodiment of FIG. 10 viewed in the direction of lines 11—11 of FIG. 10.

In some locations or in some types of vehicles, the use of a seat-backrest hook 23 may not be possible or desirable. Alternatively, greater stability than can be provided by hook 23 alone may be desired. For example, in the backseat of many automobiles, the top portion of seat backrest 16 does not extend sufficiently far above the shelf below the rear window to permit hook 23 to grip backrest 16 sufficiently to provide the desired stability. In those instances, it may be desirable to provide some other device for stabilizing partition 10. One example of such a stabilizing device is post 120 illustrated in FIGS. 10–12. In one embodiment, a single post 120, may be provided, or as illustrated in FIG. 10, two posts 120 are employed. Posts 120 are adjustable, and are designed to engage the ceiling 122 of a typical vehicle. Posts 120 may be extended to any length such that when partition 10 rests on the seat bench 14, the posts engage ceiling 122.

Figure 12:
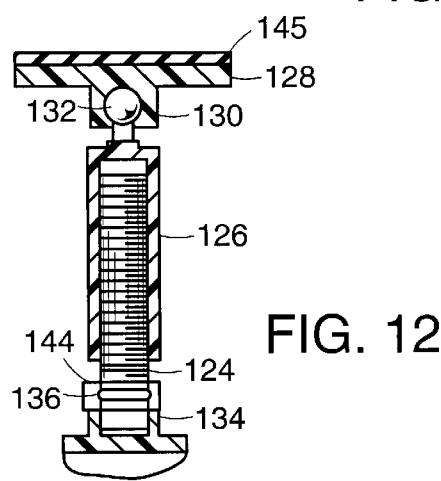
FIG. 12 is a partial, cross-sectional side view of the embodiment of FIG. 10 taken along the lines 12—12 of FIG. 11.

In a preferred embodiment, as shown in FIGS. 10–12, each post 120 includes two sections, a lower exteriorly threaded shaft 124 and an upper sleeve 126 with threads about its interior surface which are adapted to mate with the threads disposed about the exterior surface of shaft 124. Rotation of upper sleeve 126 with respect to shaft 124 adjusts the length of post 120. Each post 120 includes an upper pad 128 configured to press against ceiling 122. A non-skid coating 145 typically is disposed on the upper surface of pad 128 to prevent movement of pad 128 with respect to ceiling 122. Upper leeve 126 is rotatably mounted in a lower sleeve 130 on pad 128. Typically, a ball joint 132 is used to permit upper sleeve 126 to rotate about its axis. Ball joint 132 also permits pad 128 to pivot with respect to upper sleeve 126 to accommodate ceilings 122 of differing angles with respect to bench 14.

The lower end of shaft 124 is non-rotatably mounted in a sleeve 134. Preferably, shaft 124 is retained within sleeve 134 by an O-ring 136 which rides in a correspondingly formed slot in the interior surface of sleeve 134 or by other known mechanisms. O-ring 136 permits shaft 124 to be snapped in and out of sleeve 134. Preferably, shaft 124 includes ears 144 that extend into slots 135 in sleeve 134 to prevent rotation of shaft 124.

Post 120 may be mounted on the top edge 11 of partition plate 19 in any known manner. In a preferred embodiment, as shown in FIG. 11, each sleeve 134 is fixedly mounted on a U-shape member 142 mounted on top edge 11. Member 142 may be glued, bolted or affixed in any other way to top edge 11 of plate 19. In an alternative embodiment, each sleeve 134 may be affixed to a slide (not shown) which rides within a slot in member 142. In this manner, the location of each post 120 may be adjusted along the top edge 11 in a front-to-back position.

Preferably, in this embodiment, a U-shaped base 146 is disposed on bottom edge 71 of partition plate 19 as shown in FIG. 11. Base 146 may be glued, bolted or affixed in any other way to plate 19. Base 146 tends to broaden the area upon which a downward force is applied by partition plate 19 to prevent the application of undue stresses to a particularly narrow area of the seat bench 14 to prevent ripping or tearing thereof. Preferably, a non-skid coating 148 is provided on the lower surface of base 146 to prevent movement thereof on seat bench 14.

In use, typically partition plate 19 is placed on bench 14 with posts 120 in a retracted position, so that pads 128 are spaced from ceiling 122. Back edge 17 is placed flush with backrest 16. Once partition plate 19 has been positioned in the desired location on seat bench 14, upper sleeves 126 of posts 120 are rotated, typically in a counter-clockwise direction as shown looking downwardly from ceiling 122 towards bench 14, in FIG. 10, to extend upper sleeve 126 upwardly away from partition plate 19. The rotation continues until pad 128 engages ceiling 122. Continued rotation of upper sleeve 126 applies an upward force Fr on ceiling 122 at the same time that a downward force Fb is being applied to,seat bench 14. Rotation of upper sleeve 126 is discontinued once the desired force has been applied to retain partition plate 19 in the desired location. For removal, the process is reversed and upper sleeve 126 is rotated in the opposite direction, typically a clockwise direction, as shown looking downwardly from ceiling 122 towards bench 14 in FIG. 10, to withdraw shaft 124 within upper sleeve 126.

Once pads 128 are spaced from ceiling 122, forces $F_r$ and $F_b$ have been substantially reduced, partition plate 19 can be withdrawn from its position.

Having now described one embodiment of the present invention, it should be apparent to those skilled in the relevant art that the foregoing is illustrative only and not limiting, having been presented by way of example only. Many other schemes for providing a partition plate substantially orthogonal to a seat plate, and for securing them, are possible in accordance with the present invention. For example, numerous variations are contemplated in accordance with the present invention to connect a partition plate to a seat plate; enable the seat plate to bend, including but not limited to providing a hinge between portions of the seat plate; implementing the hinge; secure hinged portions of the seat plate in an in-use position, a portable position, or both; provide additional support by connecting the partition plate and/or seat plate to an automobile seat backrest; and so on. Numerous other embodiments, and modifications thereof, are contemplated as falling within the scope of the present invention as defined by appended claims and equivalents thereto.

What is claimed is:

1. A portable partition for use in an automobile having a seat including a seat bench and a seat backrest, comprising:
   a seat plate having first and second portions structured to rest on the seat bench;
   a partition plate having a bottom edge connected to the seat plate intermediate the first and second portions; and
   a hinge joining the first and second portions;
   wherein, when the seat plate is disposed upon the seat bench, the partition plate is disposed substantially orthogonal to the seat bench.

2. The partition of claim 1, wherein:
   the automobile has a ceiling above the seat, and
   the partition plate extends vertically from the bottom edge to a top edge that is disposed in proximity to the ceiling.

3. The partition of claim 2, further comprising:
   a post mounted on the top edge of the partition plate; and
   a pad disposed on an end of said post spaced from the partition plate, the pad being structured to engage the ceiling of the automobile, the distance between the pad and the top edge of the partition plate being adjustable.

4. The partition of claim 1, wherein the partition plate includes a back edge structured to be placed adjacent the seat backrest, and wherein the partition further comprises a seat-backrest hook connected to the back edge of the partition plate, said hook being structured and positioned to engage a top surface of the seat backrest.

5. The partition of claim 4, wherein:
   the partition plate includes a track connected to its back edge, constructed and arranged to receive the seat-backrest hook for sliding.

6. The partition of claim 5, wherein:
   the partition plate includes stopping means for selectively fixing the seat-backrest hook in the track.

7. The partition of claim 3, wherein:
   the seat bench has a depth with respect to a front and a back of the automobile and a width orthogonal to the depth, and
   the partition plate has a front edge and a depth, with respect to its back and front edges, substantially coextensive with the depth of the seat bench.

8. The partition of claim 1, further comprising:
   securing means for securing the bottom edge of the partition plate to the seat plate.

9. The partition of claim 8, wherein:
   the seat plate further comprises a channel intermediate the first and second portions structured for receiving the bottom edge of the partition plate, and
   the securing means comprises the channel and means for fixedly connecting the bottom edge of the partition plate to the seat plate when the partition plate is disposed within the channel.

10. The partition of claim 8, wherein:
    the securing means includes a snap fastener.

11. The partition of claim 1, wherein:
    the first and second portions of the seat plate each have a mutually opposing edge,
    the seat plate includes a channel having a bottom defined by the hinge and having first and second sides defined by the opposing edges of the portions of the seat plate, and
    the bottom edge of the partition plate is disposed within the channel.

12. The partition of claim 1, wherein:
    the automobile includes a seat belt; and
    the partition plate includes a seat-belt passage for receiving the seat belt.

13. The partition of claim 1, wherein:
    the hinge includes a flexible member having opposed first and second lateral edges connected respectively to the first and second portions of the seat plate.

14. The partition of claim 1, wherein:
    the partition plate is constructed in part of a substantially transparent material.

15. The partition of claim 1, wherein:
    in operation, the seat plate is medially disposed on the automobile seat.

16. The partition of claim 1, wherein:
    when not in operation, the first and second portions of the seat plate are rotatable about the hinge to a portable position such that the first and second portions are substantially parallel to the partition plate, and wherein the partition further comprises
    seat-portion securing means for securing the first and second portions of the seat plate in the portable position.

17. The partition of claim 16, further comprising:
    a seat-backrest hook connected to the back edge of the partition plate, constructed and arranged to provide a handle for carrying the partition.

18. The partition of claim 1, further comprising at least one cushion disposed at least in part upon an upper surface of said seat plate.

19. A portable partition for use in an automobile having a seat including a seat bench and a seat backrest, said partition comprising:
    a seat plate having first and second portions structured to rest on the seat bench;
    a partition plate having a bottom edge connected to the seat plate intermediate the first and second portions, the partition plate including:
       a back edge structured to be placed adjacent the seat backrest;
       a seat backrest hook connected to the back edge of the partition plate, said hook being structured and positioned to engage a top surface of the seat backrest;

a track connected to the back edge of the partition plate, the track being constructed and arranged to receive the seat backrest hook for sliding; and stopping means for selectively fixing the seat backrest hook in the track;

wherein, when the seat plate is disposed upon the seat bench, the partition plate is disposed substantially orthogonal to the seat bench.

20. A portable partition for use in an automobile having a seat including a seat bench and a seat backrest, said partition comprising:

a seat plate having first and second portions structured to rest on the seat bench;

a partition plate having a bottom edge connected to the seat plate intermediate the first and second portions; and securing means for securing the bottom edge of the partition plate to the seat plate, the securing means including a snap fastener;

wherein, when the seat plate is disposed upon the seat bench, the partition plate is disposed substantially orthogonal to the seat bench.

* * * * *